United States Patent Office 3,641,065
Patented Feb. 8, 1972

3,641,065
METHOD FOR THE PREPARATION OF
(CIS-1,2 - EPOXYPROPYL)PHOSPHONIC
ACID DERIVATIVES
Raymond A. Firestone, Fanwood, N.J., assignor to Merck & Co., Inc., Rahway, N.J.
No Drawing. Filed Feb. 3, 1969, Ser. No. 796,177
Int. Cl. C07f 9/38
U.S. Cl. 260—348 R           8 Claims

ABSTRACT OF THE DISCLOSURE

Method for preparing (cis-1,2-epoxypropyl)phosphonic di-halides, (cis-1,2-epoxypropyl)phosphonic acid esters and (cis-1,2-epoxypropyl)phosphonic acid salts which comprises treating a [2-hydroxyvinyl]onium halide, methylcarbonate (or methylsulfite) ester with a reagent capable of effecting ring closure wherein the term "onium" includes a radical selected from sulfonium, ammonium, sulfoxonium or phosphonium. The (cis-1,2-epoxypropyl) phosphonic di-halides, (cis-1,2-epoxypropyl)phosphonic acid esters and (cis-1,2-epoxypropyl)phosphonic acid salts thus obtained have utility as intermediates which may be converted to (cis-1,2-epoxypropyl)phosphonic acid. The (cis-1,2-epoxypropyl)phosphonic acid and its salt derivatives are useful as antimicrobial agents and inhibit the growth of gram-positive and gram-negative pathogenic bacteria.

---

This invention relates to a novel method for the preparation of (cis-1,2-epoxypropyl)phosphonic di-halides and (cis-1,2-epoxypropyl)phosphonic acid esters and salts (I, infra) via the reaction of a [2-hydroxyvinyl]onium halide, methyl carbonate (or methylsulfite) ester (II, infra) with a ring closing reagent selected from an alkyl phosphonic di-halide, a tri-substituted phosphite or an alkali metal phosphonate. The term "onium" includes radicals selected from sulfonium, sulfoxonium, ammonium, phosphonium and the like. The temperature at which the reaction is conducted depends on the particular ring closure reagent chosen and varies from the low temperature range of −20 to +10° C. when a phosphonic dihalide is the ring closing reagent, which reaction is usually run in the absence of a solvent, up to about 80° C. when the ring closing reagent is a tri-substituted phosphite or a di-alkali metal phosphonate. Any solvent which is inert to the reactants may be employed as the diluent, for example, ether solvents such as tetrahydrofuran, dioxane, 1,2-dimethoxyethane, diethyl ether, and the like. The following equation illustrates the process of this invention:

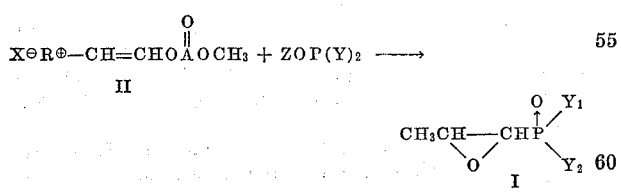

wherein A is carbon or sulfur; R⊕ is an "onium" cation which includes radicals selected from di-lower alkyl sulfonium such as dimethylsulfonium and the like, di-lower alkyl-sulfoxonium such as dimethylsulfoxonium and the like, tri-lower alkylammonium such as trimethylammonium and the like, or triarylphosphonium such as triphenylphosphonium and the like; X⊖ is a halo anion such as bromo, chloro, and the like; Y is halo such as chloro, bromo and the like, a radical of the formula: OR, wherein R is straight or branched chain alkyl, for example, straight or branched chain lower alkyl such as methyl, ethyl, propyl, isopropyl, n-butyl, n-pentyl and the like, lower alkenyl such as allyl and the like, aralkyl, for example, mononuclear aralkyl such as benzyl and the like, aryl, for example, mononuclear aryl such as phenyl and the like or a radical of the formula: OM, wherein M is the cation derived from an alkali metal such as sodium, potassium and the like; $Y^1$ is hydroxy, halo or a radical of the formula: OR, wherein R is as defined above; $Y^2$ is halo, a radical of the formula: OM, wherein M is as defined above, or a radical of the formula: OR, wherein R is as defined above, and Z is hydrogen, M or R, wherein M and R are as defined above.

The (cis - 1,2 - epoxypropyl)phosphonic di-halides and (cis - 1,2 - epoxypropyl)phosphonic acid esters prepared according to this invention are useful as intermediates in the synthesis of (±) and (−)(cis-1,2-epoxypropyl) phosphonic acid and its salts. The (±) and (−)(cis-1,2-epoxypropyl)phosphonic acid and its salts are antimicrobial agents which have utility in inhibiting the growth of gram-positive and gram-negative pathogenic bacteria. The (−) form and particularly the salts of (−)(cis-1,2-epoxypropyl)phosphonic acid such as the sodium and calcium salts, are active against Bacillus, Escherichia, Staphylococci, Salmonella and Proteus pathogens, and anti-biotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±) and (−)(cis-1,2-epoxypropyl)phosphonic acid and the salts thereof can be used as antiseptic agents to remove susceptible organisms from pharmaceutical, dental and medical equipment and can also be used in other areas subject to infection by such organisms.

In effecting the conversion of the instant (cis-1,2-epoxypropyl)phosphonic di-halides to (cis-1,2-epoxypropyl) phosphonic acid or its salts, it is only necessary to treat the former with a suitable hydrolyzing agent as, for example, with water or with an aqueous solution of an organic or inorganic acid or base. However, alkaline hydrolysis is particularly suitable inasmuch as it not only affords a method for the preparation of the pharmacologically active salts of (cis-1,2-epoxypropyl)phosphonic acid but, from a preparative standpoint, also serves to neutralize the hydrogen halide which is liberated during the reaction and which, under normal operating conditions, tends to attack the epoxide ring. Suitable alkaline reagents include, for example, the alkali and alkaline earth metal carbonates, bicarbonates, oxides and hydroxides or organic bases and the like.

The ester derivatives of (cis-1,2-epoxypropyl)phosphonic acid may be converted to (cis-1,2-epoxypropyl)-phosphonic acid or its salts by various methods, including treatment with an aqueous solution of a mineral acid, such as hydrochloric acid or sulfuric acid under carefully buffered conditions, by hydrogenolysis, by treatment with an aqueous solution of an alkali metal or alkaline earth metal hydroxide or by treatment with trimethylchlorosilane followed by aqueous hydrolysis, with the method of choice depending upon the particular ester being cleaved.

The [2-hydroxyvinyl]onium halide, methyl carbonate (or methylsulfite) ester intermediates (II, infra) which are employed in the preparation of the (cis-1,2-epoxypropyl)phosphonic di-halides and (cis-1,2-epoxypropyl)phosphonic acid esters and salts (I, supra) are obtained by treating a (2-hydroxyvinyl)onium halide alkali metal salt (III, infra) with methyl chlorocarbonate or methyl chlorosulfite, respectively. The reaction is conveniently conducted by mixing the reagents below 15° C. in an appropriate inert solvent, for example, an ether solvent such as tetrahydrofuran, in dioxane and the like, or in 1,2-dimethoxyethane and the like. The product is then isolated by removing the solvent from the reaction mixture and diluting the residue with water. The pH of the aqueous solution is adjusted to 6 and the unwanted material is removed by washing the water solution with diethyl ether followed by the removal of the water to afford the desired product. The following equation illustrates this method of preparation:

$$X^\ominus R^\oplus CH=CHO^\ominus M^\oplus + X_1 \overset{O}{\underset{\|}{A}} OCH_3 \longrightarrow$$
(III)

$$X^\ominus R^\oplus—CH=CHO\overset{O}{\underset{\|}{A}}OCH_3$$
(II)

wherein A, $X^\ominus$ and $R^\oplus$ are as defined above; and $M^\oplus$ is the cation derived from an alkali metal such as a sodium or potassium cation and the like and $X^1$ is halo such as chloro and the like.

The (2-hydroxyvinyl)onium halide alkali metal salts (III, supra) used in the preparation of the [2-hydroxyvinyl]onium halide, methylcarbonate (or methylsulfite) esters (II, supra) are conveniently prepared by treating a (formylmethyl)onium halide (IV, infra) with an alkali metal hydride. The reaction is conveniently conducted in a temperature range of from about −30 to 0° C. in an ether solvent such as 1,2-dimethoxyethane, tetrahydrofuran, dioxane and the like. The following equation illustrates this method of preparation:

$$X^\ominus R^\oplus—CH_2CHO \xrightarrow{MH} X^\ominus R^\oplus CH=CHO^\ominus M^\oplus$$
(IV) (III)

wherein $X^\ominus$, $R^\oplus$, $O^\ominus$ and $M^\oplus$ are as defined above and MH is a metal hydride such as sodium hydride and the like.

The (formylmethyl)onium halides (IV, infra) are either known compounds or may be prepared by treating a 2,2-(dialkoxyethyl)onium halide (V, infra) which has been dissolved in water, with a mineral acid such as sulfuric acid and the like. The following equation illustrates this method of preparation:

$$X^\ominus R^\oplus—CH_2CH(OR_2)_2 \xrightarrow{Acid} X^\ominus R^\oplus CH_2CHO$$
(V) (IV)

wherein $X^\ominus$ and $R^\oplus$ are as defined above and $R^2$ is alkyl, for example, lower alkyl such as methyl, ethyl, propyl and the like.

The 2,2-(di-alkoxyethyl)onium halides (V, infra) used in the preparation of the (formylmethyl)onium halides (IV, supra) may be prepared by reacting a 2,2-di-alkoxyethyl p-toluenesulfonate (VI, infra) with a nucleophilic agent, followed by the treatment of the 2,2-(di-alkoxyethyl)onium p-toluenesulfonate (VII, infra) formed, with an anion exchange resin, such as a polystyrene amine resin on its halo anion ($X^\ominus$) cycle, to yield the desired (di-alkoxyethyl)onium halide (V, infra). The temperature at which the reaction may be conducted depends on the nature of the particular nucleophilic agent employed. For example, the reaction using a di-lower alkyl sulfide is most advantageously run at ambient temperature; when a tri-lower alkyl amine is used, the reaction may be conducted in a closed vessel at about 100° C., and when the reaction is conducted with a di-lower alkylsulfoxide, the temperature of the reaction may be up to the boiling point of the particular sulfoxide employed. The following equation illustrates this method of preparation:

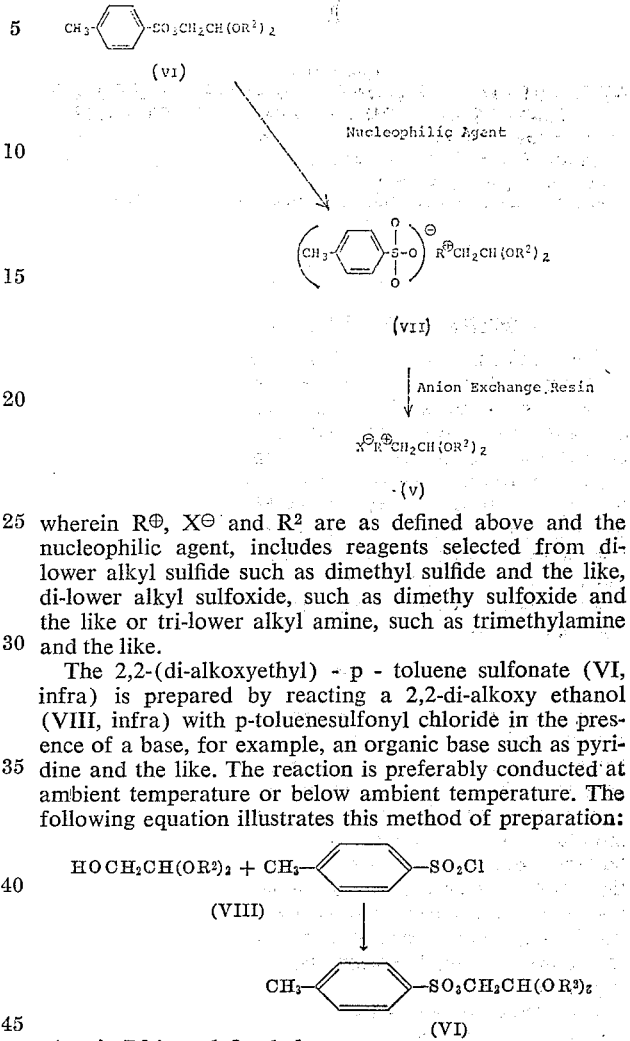

wherein $R^\oplus$, $X^\ominus$ and $R^2$ are as defined above and the nucleophilic agent, includes reagents selected from di-lower alkyl sulfide such as dimethyl sulfide and the like, di-lower alkyl sulfoxide, such as dimethy sulfoxide and the like or tri-lower alkyl amine, such as trimethylamine and the like.

The 2,2-(di-alkoxyethyl) - p - toluene sulfonate (VI, infra) is prepared by reacting a 2,2-di-alkoxy ethanol (VIII, infra) with p-toluenesulfonyl chloride in the presence of a base, for example, an organic base such as pyridine and the like. The reaction is preferably conducted at ambient temperature or below ambient temperature. The following equation illustrates this method of preparation:

$$HOCH_2CH(OR^2)_2 + CH_3-\text{C}_6\text{H}_4-SO_2Cl$$
(VIII)

$$\downarrow$$

$$CH_3-\text{C}_6\text{H}_4-SO_3CH_2CH(OR^2)_2$$
(VI)

wherein $R^2$ is as defined above.

The planar Formula (a) $Z^1OP(Y)_2$ is one of two tautomeric structures by which the phosphite and phosphonate reactants of this invention may be illustrated; however, it will be appreciated by those skilled in the art that because of tautomerization said formula can also be depicted as (b)

$$Z^1—\overset{O}{\underset{\uparrow}{P}}(Y)_2 \text{ as shown below:}$$

$$Z^1OP(Y)_2 \rightleftarrows Z^1—\overset{O}{\underset{\uparrow}{P}}(Y)_2$$
(a) (b)

wherein $Z^1$ is hydrogen or an alkali metal cation and Y is defined above. In this specification both the trivalent phosphite (a) and the pentavalent phosphonates (b) are meant to be included. The instant process is capable of wide modification and it should be apparent to one of ordinary skill that the use of a tautomeric reactant in an otherwise similar process is within the skill of the artisan to select and does not constitute a departure from this invention.

The designation cis used in describing the 1,2-epoxypropylphosphonic acid compounds means that each of the hydrogen atoms attached to carbon atoms 1 and 2 of the propylphosphonic acid are on the same side of the oxide ring.

The examples which follow illustrate a method for preparing (cis-1,2-epoxypropyl)phosphonic di-halides, (cis- 1,2 - epoxypropyl)phosphonic acid esters and (cis - 1,2-epoxypropyl)phosphonic acid salts according to the process of this invention. However, the examples are illustrative only and it will be apparent to one having ordinary skill that all of the products of the invention may be prepared by substituting the appropriate starting materials for those used in the examples.

EXAMPLE 1.—(CIS-1,2-EPOXYPROPYL)PHOSPHONIC DICHLORIDE

Step A: 2,2-dimethoxyethyl-p-toluenesulfonate 2,2-dimethoxy ethanol (10.0 g., 0.094 mole) is dissolved in pyridine (100 ml.) and treated with p-toluenesulfonyl chloride (17.9 g., 0.094 mole) at 25° C. The pyridine is evaporated in vacuo, the residue is taken up in ether (100 ml.), and the ether solution washed twice with water. After drying the ether solution with sodium sulfate, the ether is removed in vacuo and the residue is fractionally distilled under vacuum to yield 2,2-dimethoxyethyl-p-toluene-sulfonate.

Step B: 2,2-dimethoxyethyl dimethylsulfonium chloride 2,2-dimethoxyethyl-p-toluenesulfonate (20.0 g., 0.0716 mole) is treated with dimethyl sulfide (10.0 g., 0.16 mole) under pressure for one week at 25° C., forming (2,2-dimethoxyethyl)dimethylsulfonium - p - toluenesulfonate, which is purified by evaporating the excess dimethyl sulfide, followed by recrystallization of the residue from methanol. A 5% aqueous solution of (2,2-dimethoxyethyl)dimethylsulfonium - p - toluenesulfonate is passed through a column containing a twofold molar excess of a polystyrene amine resin on the chloride cycle. Elution with water provides an aqueous solution of 2,2-dimethoxyethyl dimethylsulfonium chloride. The product is isolated by evaporation of the water and purified by recrystallization from methanol.

Step C: (Formylmethyl)dimethylsulfonium chloride

A 5% solution of 2,2-dimethoxyethyl dimethylsulfonium chloride (10.0 g., 0.0537 mole) in water (200 g.) is acidified with a trace of sulfuric acid and allowed to stand one hour at 25° C. The acid is neutralized with sodium bicarbonate, the water is removed under reduced pressure, and the residue is dried by adding benzene to make a loose slurry and distilling the benzene. This is repeated twice more to yield substantially pure (formylmethyl)dimethylsulfonium chloride.

Step D: 2-hydroxyvinyl)dimethylsulfonium chloride sodium salt

To a suspension of (formylmethyl)dimethylsulfonium chloride (10.0 g., 0.071 mole) in 1,2-dimethoxyethane (100 ml.) is added sodium hydride (1.68 g., 0.071 mole) to yield (2-hydroxyvinyl)dimethylsulfonium chloride sodium salt.

Step E: (2-hydroxyvinyl)dimethylsulfonium chloride, methyl carbonate ester

To the suspension of (2-hydroxyvinyl)dimethylsulfonium chloride sodium salt (11.5 g., 0.071 mole) in 1,2-dimethoxyethane (100 ml.) is added methyl chlorocarbonate (6.7 g., 0.071 mole) in 1,2-dimethoxyethane (25 ml.). After a few minutes the reaction is complete and the solvent is removed. The residue is dissolved in water (100 ml.) and the pH is adjusted to 6 by the addition of dilute hydrochloric acid. This solution is then washed with ether and the water removed under vacuum, below 30° C., to afford crude (2-hydroxyvinyl)dimethylsulfonium chloride, methyl carbonate ester. The crude product is dissolved in warm methanol and filtered to remove the sodium chloride. Diethyl ether is added to the methanol solution to precipitate the product which is collected by filtration and recrystallized from a mixture of methanol and ether to yield substantially pure (2-hydroxyvinyl) dimethylsulfonium chloride, methyl carbonate ester.

Step F: (Cis-1,2-epoxypropyl)phosphonic dichloride

To (2-hydroxyvinyl)dimethylsulfonium chloride, methyl carbonate ester (10.0 g., 0.05 mole) at 0° C. is added methoxy dichloro phosphine (6.7 g., 0.05 mole). The reaction mixture is maintained at 0° C. for 24 hours and then allowed to warm up to 20° C. Fractional distillation of the residue yields (cis-1,2-epoxypropyl)phosphonic dichloride.

By substituting for the (formylmethyl)dimethylsulfonuim chloride of Example 1, Step D, an equimolar quantity of (formylmethyl)trimethylammonium chloride or (formylmethyl)triphenylphosphonium bromide and by following substantially the procedure described therein there is obtained respectively (2-hydroxyvinyl)trimethylammonium chloride sodium salt and (2-hydroxyvinyl)triphenylphosphonium bromide salt which, when substituted for the (2-hydroxyvinyl)dimethylsulfonium chloride sodium salt of Step E, and by following the procedure described therein there is obtained (2 - hydroxyvinyl)trimethylammonium chloride, methyl carbonate and (2-hydroxyvinyl)triphenylphosphonium bromide, methyl carbonate ester respectively, which when substituted for the (2-hydroxyvinyl)dimethylsulfonium chloride, methyl carbonate ester of Step E, Example 1, affords (cis-1,2-epoxypropyl)phosphonic dichloride.

EXAMPLE 2.—DIMETHYL (CIS-1,2-EPOXYPROPYL)PHOSPHONATE

To (2 - hydroxyvinyl)dimethylsulfonium chloride, methyl carbonate ester (10.0 g., 0.05 mole) at 10° C. is added trimethylphosphite (6.2 g., 0.05 mole). The reaction mixture is stirred at 10° C. for 24 hours and then fractionally distilled to yield dimethyl (cis-1,2-epoxypropyl)phosphonate.

EXAMPLE 3.—(CIS-1,2-EPOXYPROPYL)-PHOSPHONIC ACID MONOSODIUM SALT

To a solution of (2 - hydroxyvinyl)triphenylphosphonium bromide, methyl carbonate ester (10.0 g., 0.025 mole) in tetrahydrofuran (50 ml.) is added disodium phosphonate (3.6 g., 0.025 mole). The reaction mixture is refluxed for 5 hours and then the reaction mixture filtered and the solvent removed from the filtrate to yield (cis-1,2-epoxypropyl)phosphonic acid monosodium salt.

EXAMPLE 4.—DIBENZYL (CIS-1,2-EPOXYPROPYL)PHOSPHONATE

To a solution of (2-hydroxyvinyl)trimethylammonium chloride, methyl carbonate ester (10.0 g., 0.05 mole) in tetrahydrofuran is added dibenzyl sodium phosphite (14.2 g., 0.05 mole) in tetrahydrofuran (100 ml.). The solution is refluxed until no more sodium chloride precipitates. The reaction mixture is filtered and the solvent removed from the filtrate to yield dibenzyl (cis-1,2-epoxypropyl)phosphonate.

EXAMPLE 5.—(CIS-1,2-EPOXYPROPYL)PHOSPHONIC DICHLORIDE

Step A: (2-hydroxyvinyl)dimethylsulfonium chloride, methyl sulfite ester

To a suspension of (2 - hydroxyvinyl)dimethylsulfonium chloride sodium salt (10.0 g., 0.0618 mole) is added a solution of the methyl chlorosulfite (6.35 g., 0.0618 mole) in tetrahydrofuran (100 ml.). The mixture is stirred at room temperature for one hour and the solvent removed under vacuum. The residue is dissolved in water (100 ml.) and the pH of the solution is brought to 6 by the addition of dilute hydrochloric acid. The solution is washed with ether and the water removed under vacuum, below 30° C., to yield the crude product. The crude product is dissolved in warm methanol and filtered to remove the sodium chloride. Diethyl ether is added to the methanol solution to precipitate the (2-hydroxyvinyl)dimethylsulfonium chloride, methylsulfite ester.

Step B: (Cis-1,2-epoxypropyl)phosphonic dichloride

To (2 - hydroxyvinyl)dimethylsulfonium chloride, methylsulfite ester (10.0 g., 0.0514 mole) at 0° C. is added methoxy dichloro phosphine (6.7 g., 0.05 mole). The reaction mixture is maintained at 0° C. for 24 hours and then fractionally distilled to yield substantially pure (cis-1,2-epoxypropyl)phosphonic dichloride.

By substituting for the (2-hydroxyvinyl)dimethylsulfonium chloride sodium salt of Step A, Example 5, an equimolar quantity of (2 - hydroxyvinyl)dimethylsulfoxonium chloride potassium salt, (2 - hydroxyvinyl)trimethylammonium chloride sodium salt or (2-hydroxyvinyl)triphenylphosphonium bromide sodium salt and by following substantially the procedure described therein, there is obtained respectively (2-hydroxyvinyl)dimethylsulfoxonium chloride, methyl sulfite ester; (2-hydroxyvinyl)trimethylammonium chloride, methyl sulfite ester and (2 - hydroxyvinyl)triphenylphosphonium bromide, methyl sulfite ester which products when substituted for (2-hydroxyvinyl)dimethylsulfonium chloride, methyl sulfite of Step B, Example 5, and by following substantially the procedure described therein, affords (cis-1,2-epoxypropyl)phosphonic dichloride.

EXAMPLE 6.—(CIS-1,2-EPOXYPROPYL)PHOSPHONIC ACID MONO-POTASSIUM SALT

Step A: 2,2-dimethoxyethyl dimethylsulfoxonium chloride 2,2-dimethoxyethyl p-toluenesulfonate (10 g., 0.0358 mole) is heated with dimethylsulfoxide (100 ml.) at 150° C. for 24 hours. The solvent is removed under reduced pressure and the residue recrystallized from methanol to yield (2,2 - dimethoxyethyl)dimethylsulfonium p-toluenesulfonate. A 5% aqueous solution of (2,2-dimethoxyethyl)dimethylsulfonium p-toluenesulfonate is passed through a column containing a twofold molar excess of a polystyrene amine resin on the chloride cycle. Elution of the column with water provides an aqueous solution of 2,2-dimethoxyethyl dimethylsulfoxonium chloride. The product is isolated by removal of the water and recrystallization of the residue from methanol.

Step B: (Formylmethyl)dimethylsulfoxonium chloride

A 5% solution of 2,2 - dimethoxyethyl dimethylsulfoxonium chloride (10 g., 0.0515 mole) in water (200 g.) is acidified with a trace of sulfuric acid at ambient temperature. The reaction mixture is allowed to stand for one hour and then the solution is neutralized with sodium bicarbonate. The water is removed under reduced pressure and the residue is dried by adding benzene to make a loose slurry and distilling the benzene to yield (formylmethyl)dimethylsulfoxonium chloride.

Step C: (2-hydroxyvinyl)dimethylsulfoxonium chloride potassium salt

To a suspension of (formylmethyl)dimethylsulfoxonium chloride (10.0 g., 0.064 mole) in 1,2-dimethoxyethane (100 ml.) is added potassium hydride (2.56 g., 0.064 mole) to yield (2-hydroxyvinyl)dimethylsulfoxonium chloride potassium salt.

Step D: (2-hydroxyvinyl)dimethylsulfoxonium chloride, methyl carbonate ester To a suspension of (2-hydroxyvinyl)dimethylsulfoxonium chloride potassium salt (12.5 g., 0.064 mole) in 1,2-dimethoxyethane (100 ml.) is added methyl chlorocarbonate in 1,2-dimethoxyethane (25 ml.). The reaction is stirred for a few minutes, the solvent is removed, and the residue is dissolved in water (100 ml.). The pH of the aqueous solution is adjusted to 6 by the addition of dilute hydrochloric acid. This solution is washed with ether and the water removed under reduced pressure, below 30° C., to yield (2,2-hydroxyvinyl)dimethylsulfoxonium chloride, methyl carbonate ester.

Step E: (Cis-1,2-epoxypropyl)phosphonic acid mono-potassium salt

To a solution of (2-hydroxyvinyl)dimethylsulfoxonium chloride, methyl carbonate ester (5.4 g., 0.025 mole) in tetrahydrofuran (50 ml.) is added di-potassium phosphonate (3.28 g., 0.025 mole). The reaction mixture is refluxed five hours and then filtered and the solvent removed from the filtrate to yield (cis-1,2-epoxypropyl)phosphonic mono-potassium salt.

Thus by substituting the appropriate alkyl phosphonic dihalide, phosphite or phosphonate for the methylphosphonic dichloride of Step F, Example 1, and by following the procedure described therein all of the products of this invention may be prepared. The following equation illustrates the manner in which the products of Table I may be prepared:

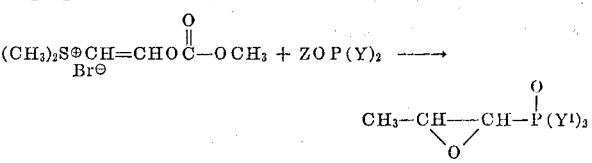

TABLE I

| Ex. | Z | Y | Y₁ |
|---|---|---|---|
| 7 | —CH₃ | Br | Br |
| 8 | —C₂H₅ | —OC₂H₅ | —OC₂H₅ |
| 9 | Na | —OCH₂CH₂CH₃ | —OCH₂CH₂CH₃ |
| 10 | —CH(CH₃)₂ | —OCH(CH₃)₂ | —OCH(CH₃)₂ |
| 11 | —CH₂CH=CH₂ | —OCH₂CH=CH₂ | —OCH₂CH=CH₂ |
| 12 | —CH₂(CH₂)₂CH₃ | —OCH₂(CH₂)₂CH₃ | —OCH₂(CH₂)₂CH₃ |
| 13 | K | —OCH₂(CH₂)₃CH₃ | —OCH₂(CH₂)₃CH₃ |
| 14 | —⟨phenyl⟩ | —O—⟨phenyl⟩ | —O—⟨phenyl⟩ |

The above examples are illustrative of the novel method disclosed and it is to be understood that the invention is not to be limited by the specific illustrative examples but rather embraces all the variations and modifications thereof which fall within the scope of the foregoing discussion and the appended claims.

We claim:

1. A process for preparing a compound having the formula:

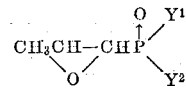

wherein Y¹ is hydroxy, halo, or a radical of the formula: OR, wherein R is straight or branched chain alkyl, lower alkenyl, aralkyl or aryl and Y² is halo, a radical of the formula: OM, wherein M is the cation derived from an alkali metal, or a radical of the formula: OR, wherein R is as defined above, which comprises treating a compound having the formula:

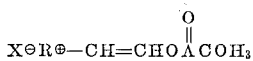

wherein A is carbon or sulfur; R⊕ is di-lower alkylsulfonium, di-lower alkylsulfoxonium, tri-lower alkylammonium or triarylphosphonium, and X⊖ is a halo anion, with a compound having the formula:

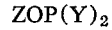

wherein Y is halo, a radical of the formula: OR, wherein R is as defined above or a radical of the formula: OM, wherein M is as defined above, and Z is hydrogen, M or R, wherein M and R are as defined above.

2. A process according to claim 1 for preparing (cis-1,2-epoxypropyl)phosphonic dihalides, which comprises treating a [2-hydroxyvinyl]onium halide, methyl carbonate (or methyl sulfite) ester with an alkoxy dihalo phosphine.

3. A process according to claim 1 for preparing (cis-1,2-epoxypropyl)phosphonic acid esters, which comprises treating a [2-hydroxyvinyl]onium halide, methyl carbonate (or methyl sulfite) ester with a tri-lower alkylphosphite, an alkali metal diaralkylphosphite or a lower alkyl dihalophosphite.

4. A process according to claim 1 for preparing (cis-1,2-epoxypropyl)phosphonic acid salts, which comprises treating a [2-hydroxyvinyl]onium halide, methyl carbonate (or methyl sulfite) ester with a di-alkali metal phosphonate.

5. A process according to claim 1 for preparing a compound having the formula:

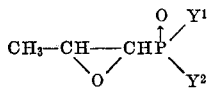

wherein $Y^1$ is hydroxy, halo, or a radical of the formula: OR, wherein R is straight or branched chain alkyl, lower alkenyl, aralkyl or aryl and $Y^2$ is halo, a radical of the formula: OM, wherein M is the cation derived from an alkali metal, or a radical of the formula: OR, wherein R is as defined above, which comprises treating a compound having the formula:

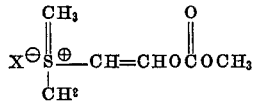

wherein $X^\ominus$ is a halo anion, with a compound having the formula:

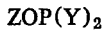

wherein Y is halo, a radical of the formula: OR, wherein R is as defined above or a radical of the formula: OM, wherein M is as defined above, and Z is hydrogen, M or R, wherein M and R are as defined above.

6. A process according to claim 1 for preparing a compound having the formula:

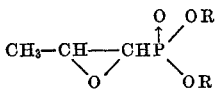

wherein R is lower alkyl, allyl, benzyl or phenyl, which comprises treating a compound of the formula:

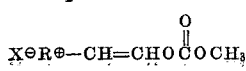

wherein $R^\oplus$ is dimethylsulfonium, dimethylsulfoxonium, trimethylammonium or triphenylphosphonium and $X^\ominus$ is a halo anion, with a compound of the formula:

wherein R is as defined above.

7. A process according to claim 1 for preparing a compound having the formula:

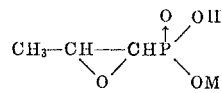

wherein M is a cation derived from an alkali metal, which comprises treating a compound of the formula:

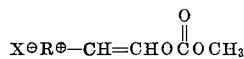

wherein $R^\oplus$ is dimethylsulfonium, dimethylsulfoxonium, trimethylammonium or triphenylphosphonium and $X^\ominus$ is a halo anion, with a compound of the formula:

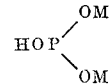

wherein M is a cation derived from an alkali metal.

8. A process according to claim 1 for preparing a compound having the formula:

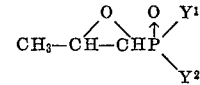

wherein $Y^1$ and $Y^2$ are chloro or bromo, which comprises treating a compound having the formula:

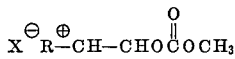

wherein $R^\oplus$ is dimethylsulfonium, dimethylsulfoxonium, trimethylammonium or triphenylphosphonium and $X^\ominus$ is a halo anion, with a compound having the formula:

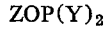

wherein Z is lower alkyl and Y is chloro or bromo.

No references cited.

NORMA S. MILESTONE, Primary Examiner

U.S. Cl. X.R.

260—607 B, 606.5 F, 567.6 M, 598, 456 R, 463, 602